United States Patent [19]

Ovshinsky et al.

[11] Patent Number: 4,545,883

[45] Date of Patent: Oct. 8, 1985

[54] ELECTROLYTIC CELL CATHODE

[75] Inventors: Stanford R. Ovshinsky, Bloomfield Hills; Krishna Sapru, Troy; Edmund L. Yee, Warren, all of Mich.

[73] Assignee: Energy Conversion Devices, Inc., Troy, Mich.

[21] Appl. No.: 399,892

[22] Filed: Jul. 19, 1982

[51] Int. Cl.[4] .................. C25C 15/00; C25B 11/00
[52] U.S. Cl. ................. 204/192 SP; 204/290 R; 204/290 F; 204/292; 502/101; 502/255; 502/259; 502/260; 502/307; 502/309; 502/311; 502/312; 502/313; 502/326; 502/327; 502/332; 502/335
[58] Field of Search ......... 204/290 F, 290 R, 192 SP; 252/425.3; 502/101, 255, 259, 260, 307, 309, 311, 312, 313, 326, 327, 332, 335

[56] References Cited

U.S. PATENT DOCUMENTS

| | | | |
|---|---|---|---|
| 3,957,692 | 5/1976 | Cairns | 204/192 SP |
| 4,080,278 | 3/1978 | Ravier | 204/290 R |
| 4,116,804 | 9/1978 | Neides | 204/290 R |
| 4,244,798 | 1/1981 | Gold | 204/192 SP |
| 4,275,126 | 6/1981 | Bergmann | 204/192 SP |
| 4,278,568 | 7/1981 | Lohrberg | 204/425.3 |
| 4,279,709 | 7/1981 | McIntyre | 204/290 R |
| 4,289,650 | 9/1981 | Gray | 252/425.3 |
| 4,309,315 | 1/1982 | Nakamura | 252/425.3 |
| 4,328,080 | 5/1982 | Harris | 204/192 SP |

Primary Examiner—John F. Niebling
Attorney, Agent, or Firm—Timothy H. Gens; Lawrence G. Norris; Richard M. Goldman

[57] ABSTRACT

A material for acting as a catalyst for hydrogen evolution in an electrolytic cell is formed from a host matrix including at least one transition element which is structurally modified by incorporating one or more modifier elements at least one of which is a transition element to improve its catalytic properties. The utilization of a disordered material, which can be any of a number of different disordered structures, makes possible the modification of local order chemical environments of the material to create catalytical active sites for the hydrogen evolution reaction. Modifier elements, including for example Ti, Mo, Sr, Si, La, Ce, O and Co, structurally modify the local chemical environments of the host matrix formed of a transition element such as Ni, Mo, or Co to provide a material having an increased density of catalytically active sites which exhibits low overvoltages when utilized as a catalytic material for a electrolyte cell cathode. The material may also include a leachable modifier element, such as Al or Zn, which is partially removed to further modify the material and enhance its catalytic activity. The catalytic material can be formed by vacuum deposition techniques such as by cosputtering the host matrix and modifier elements to form a layer of catalytic material on an electrode substrate.

25 Claims, No Drawings

ELECTROLYTIC CELL CATHODE

BACKGROUND OF THE INVENTION

The present invention relates generally to catalytic bodies and more specifically to catalytic bodies for use as cathodes in an electrolytic cell.

The electrolytic decomposition of alkali metal chlorides has long been practiced by the chlor-alkali industry for the production of chlorine gas, caustic, and hydrogen gas. The major components of the cell in which such electrolysis takes place usually includes an anode and a cathode which are in contact with an electrolytic solution, and a diaphragm or membrane separator in the cell to separate the anode and cathode and their reaction products. In operation, the electrolyte, such as sodium chloride or potassium chloride, is continually fed into the cell and a voltage is applied across the anode and cathode. This produces electrochemical reactions which take place at the anode or cathode to form the desired products.

The particular materials utilized for the cathode and anode are important since they respectively provide the necessary catalysts for the reactions taking place at the cathode and anode. The electrolyic solution reacts at the anode to evolve chlorine gas: $2Cl^- \rightarrow CL_2 + 2e^-$. The electrolytic solution reacts at the cathode to produce an alkali metal hydroxide or caustic such as sodium hydroxide, and evolve hydrogen gas: $H_2O + 2e^- \rightarrow H_2 + 2OH^{31}$. The role which the cathode catalyst M plays in evolving hydrogen is shown by the following equations:

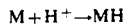

$$M + H^+ \rightarrow MH$$

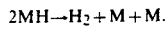

$$2MH \rightarrow H_2 + M + M.$$

The applied voltage required to produce the above reactions is the sum of the decomposition voltage (thermodynamic potential) of the compounds in the electrolyte being electrolized, the voltage required to overcome the resistance of the electrolyte and the electrical connectors of the cell, and the voltage required to overcome the resistance to the passage of current at the surface of the anode and cathode (charge transfer resistance). The charge transfer resistance is referred to as the overvoltage. The overvoltage represents an undesirable energy loss which adds to the operating costs of the electrolytic cell.

The reduction of the overvoltage at the cathode to lower operating cost of the cell has been the subject of much attention in the prior art. More specifically, the attention has been directed at the reduction of overvoltage caused by the charge transfer resistance at the surface of the cathode due to catalytic inefficiencies of the particular cathode materials utilized.

The cathode overvoltage losses can be quite substantial in chlor-alkali cells. For example, for mild steel cathodes, the cathode material most commonly used by the chloralkali industry, the charge transfer resistance is on the order of 270 mV to 450 mV at one set of typical operating conditions, e.g., electrolyte temperature of 80° C. and current density of 1 KA/m². Such cells are used to annually produce a significantly large amount of product and hence the total electrical energy consumed amounts to a very substantial sum especially in view of todays high energy costs. Such a large amount of energy is consumed that even a small savings in the overvoltage such at 30–50 mV would provide a significant reduction in operating costs. Furthermore, due to the trend of rapidly rising costs for electrical energy, the need for reduced overvoltages takes on added importance since the dollar value of the energy to be saved continually is increasing.

Because of decreasing supplies of fossil fuels, the production of hygrogen by electrolysis has taken an increased importance as a potential source of fuel. While hydrogen is a relatively low cost fuel, petroleum based fuels are presently less expensive. One way to make hydrogen more cost competitive is by reducing the energy involved in its production. This can be accomplished in an electrolytic cell by reducing the overvoltages at which such cells operate. Hydrogen produced by electrolysis presently is primarily used to meet the needs of users requiring a very high grade hydrogen. A reduction in overvoltages would provide a further economic advantage over other hydrogen production methods as well as conserving energy.

As stated before, the cathode material which is most commonly used in the chlor-alkali industry and also by the water electrolysis industry is mild steel. Mild steel is utilized because of the low cost of this material and its relative stability in the caustic environment of the electrolyte. Nickel is another material which has also been put to considerable industrial use as a cathode material for hydrogen evolution. Nickel cathodes, however, while somewhat more stable in caustic, exhibit even greater overvoltages than mild steel. Nevertheless, the excessive overvoltages provided by mild steel and nickel cathodes have been reluctantly tolerated by the industry since an acceptable alternative cathode material has not been available and the cost of electrical power until recently was not a major cost consideration.

Mild steel as well as other materials proposed for use as a catalytic material for cathodes for an electrolytic cell, have generally been limited to materials which are substantially crystalline structures. In a crystalline material the catalytically active sites which provide the catalytic effect of such materials result from accidently occurring, surface irregularities which interrupt the periodicity of the crystalline lattice. A few examples of such surface irregularities are dislocation sites, crystal steps, surface impurities and foreign adsorbates.

A major shortcoming with basing the cathode materials on a crystalline structure is that irregularities which result in active sites typically only occur in relatively few numbers on the surface of a crystalline material. This results in a density of catalytically active sites which is relatively low. Thus, the catalytic efficiency of the material is substantially less than that which would be possible if a greater number of catalytically active sites were available for the hydrogen evolution reaction. Such catalytic inefficiencies result in overvoltages which add substantially to the operating costs of the electrolytic cells.

One prior art attempt to increase the catalytic activity of the cathode was to increase the surface area of the cathode by the use of a "Raney" nickel cathode. Raney nickel production involves the formation of a multi-component mixture, such as nickel and aluminum, followed by the selective removal of the aluminum, to increase the actual surface area of the material for a given geometric surface area. The resulting surface area for Raney nickel cathodes is on the order of 100–1000 times greater than the geometric area of the material.

This is a greater surface area than the mild steel and nickel cathodes discussed above.

One process for forming a Raney nickel catalyst is described in U.S. Pat. No. 4,116,804. The process involves plating and flame spraying layers of nickel and aluminum respectively, on an electrode substrate, followed by heating the layers at a temperature of at least 660° C. to cause inter-diffusion of the metals. The inter-diffused aluminum is then leached out to give a high surface area nickel coating which exhibits an initial overvoltage which is less than nickel catalysts having a relatively smooth surface.

The Raney nickel catalyst is very unstable, because it is quite susceptible to oxidation in ambient air and consequently must be protected from contact with air when not submersed in the electrolytic cell. Raney nickel cathodes also lack mechanical stability during hydrogen evolution. The degradation reduces the operating life of Raney nickel cathodes and thus they have not been widely accepted for industrial use. Furthermore, the process for producing Raney nickel is relatively costly due to the expense of the various metallurgical processes involved.

Another prior art approach to lower the overvoltage of cathode catalysts has been centered around the use of materials which are inherently better catalysts than mild steel or nickel. Crystalline compositions including noble metals such as platinum, palladium, ruthenium and the like can provide catalysts which exhibit lower overvoltages during utilization as a cathode catalyst, but these materials have other major drawbacks which have prevented a widespread acceptance by industrial users of electrolytic cells. First, these materials are quite expensive, relatively scarce and are usually obtained from strategically vulnerable areas. Platinum catalyst cathodes, for example, when used in an industrial electrolytic cell initially provide low overvoltage at a high cost which renders such materials unsuitable for commercial electrolysis. Another drawback is that once placed into operation in an electrolytic cell, further degradation problems arise since the noble metal materials are quite susceptible to "poisoning".

Poisoning occurs when the catalytically active sites of the material become inactivated by poisonous species invariably contained in the electrolytic solution. These impurities can, for example, include contaminants contained in the electrolyte such as the impurities normally found in untreated water, including calcium, magnesium, iron and copper. Once inactivated such sites are thus no longer available to act as a catalyst for the desired reaction. The use of noble metal containing cathode catalysts other than platinum have also been attempted. These materials have been found to be quite susceptible to poisoning and thus unacceptable for industrial use.

Other attempts have been made to develop materials which offer an improvement upon the mild steel and nickel catalysts commercially used. For example, electrodes made of steel and the like, have been coated by electroplating the same with various materials providing crystalline coatings thereon. While such electrodes provided somewhat reduced hydrogen overvoltages when operated in a chlor-alkali cell, they were subject to corrosion and degradation problems. U.S. Pat. Nos. 4,033,837 and 4,105,531 disclose electroplating an alloy of nickel (80-20%), molybdenum (10-20%) and vanadium (0.2-1.5%) on a conductive electrode to provide a material for use as a chlor-alkali cathode. This material had a somewhat lower overvoltage than uncoated steel, but also suffered from degradation problems.

U.S. Pat. No. 4,080,278 discloses cathode electrodes for an electrolytic cell coated with a compound of the general formula $A_xB_yO_z$ where A is an alkali or lathanide metal, B is chosen from the group: Ti, W, Mo, Mn, Co, V, Nb, Ta; and oxygen. The compound is mixed with a binder metal and coated on an electrode base using techniques that include plasma and flame spraying of powdered material, vacuum evaporation, sputtering, and explosive bonding. In some cases, the techniques of the aforementioned patent may result in amorphous coatings, however it is not an object of the invention to prepare amorphous coatings, and, in fact, it appears to be the intention of that patent to return the amorphous coating to a crystalline condition, since the latter patent refers to heating the amorphous films to return them to their crystalline state. Furthermore, no desirable properties or examples of the article thus formed are ascribed to amorphicity or vacuum deposition.

Another process for the production of catalysts for the cathodic hydrogen evolution in an alkaline electrolyte is disclosed in U.S. Pat. No. 3,926,844. This process involves the deposition of amorphous borides of nickel, cobalt or iron by the reduction of their salts in an aqueous bath. While the materials thus prepared are amorphous, and do exhibit some electrocatalytic activity, the method is of limited utility. The range of compositions that can be prepared by this method is quite limited because of the compositional restrictions imposed by the process conditions involved. While low overvoltage is discussed, it does not appear that the overvoltage is in the range of the low overvoltage of the present invention and the only operating examples given are for a temperature of 20° C. which is well below general industry operating temperatures which are in the range of 70° C. to 120° C. and very commonly 80° C. to 90° C. This particular attempt at utilizing a material not having a substantially crystalline structure did not provide a cathode catalyst which has been accepted for commercial use to any significant degree. Since overvoltage drops with an increase in temperature, the lack of higher temperature results, would appear to indicate degradation of the material at the higher temperatures at which the material would be utilized.

In summary, the field relating to catalytic materials for electrolytic cell cathodes has been generally predicated on substantially crystalline materials. Of such materials, those which are capable of withstanding an industrial environment, such as mild steel and nickel, have catalytic inefficiencies which result in relatively high overvoltages adding significantly to operating costs. Those materials which exhibit lower overvoltages than mild steel and nickel, such as noble metal catalysts, are expensive and/or subject to poisoning or degradation. Thus, there remains the need for a stable, low overvoltage cathode material of low cost to replace the presently used cathode materials for hydrogen evolution in an electrolytic cell.

SUMMARY OF THE INVENTION

The disadvantages of the prior art are overcome by providing disordered multicomponent catalytic materials which can be tailor-made to exhibit optimum catalytic activity for cathodic hygrogen evolution in an electrolyte cell. The catalytic materials provided by the present invention have a greater density of active sites and have improved catalytic activity in comparison to materials commonly used for electrolytic cell cathodes, such as mild steel and nickel. The increased catalytic activity of the materials of the present invention serves to significantly reduce the overvoltages exhibited by the cathode of an electrolytic cell to thereby reduce operating costs. The cathode materials are also resistant to poisoning due to their increased density of catalytically active sites and can provide a stable performance over a long period of time.

The catalytic materials of the present invention are formed from a wide range of compositions and desired structural configurations so as to exhibit optimum catalytic activity for the hydrogen evolution reaction. Tailoring of the local structural and chemical order of the materials of the present invention is of great importance to achieve the desired characteristics. Amorphous materials having only short range order can be utilized as can crystalline materials having long range order, but where the structure is deliberately modified to increase the density of catalytically active sites above that obtainable in the prior art.

The improved catalytic activity of the present invention is accomplished by manipulating the local chemical order and hence the local structural order by the incorporation of selected modifier elements into a host matrix to create the desired disordered material. The desired multicomponent disordered material can be amorphous, polycrystalline (but lacking long range compositional order), or microcrystalline in structure or an intimate mixture of any combination of those phases.

The host matrix of the present invention includes at least one transition element and at least one modifier element intimately incorporated into the host matrix. The incorporation of the modifier element or elements acts to disorder the structure of the material and to create local structural chemical environments which are capable of acting as catalytically active sites for the hydrogen evolution reaction. The utilization of a disordered structure allows the creation of an increased density and a wide spectrum of catalytically active sites to yield materials which operate at high catalytic efficiency and very low overvoltages.

The disordered materials of the present invention also can be formed with a high surface area by the incorporation of aluminum, zinc or the like, which are then at least partially leached out of the material without effecting the stability of the material. This is in contrast to the Raney nickel process which results in an unstable material.

The materials are preferably formed as a layer on a substrate which can be of conventional configurations and materials. Deposition of the components forming the catalytic layer is preferably accomplished by vacuum deposition techniques, such as cosputtering. Such methods are advantageous since they allow a very intimate mixing of the components on an atomic scale to provide the desired disordered structure and create local structural chemical environments which have catalytically active sites.

DETAILED DESCRIPTION

The present invention provides multicomponent materials having tailor-made local structural chemical environments which are designed to yield excellent catalytic characteristics for electrolytic cell cathodes. The manipulation of local structural chemical environments to provide catalytically active sites is made possible by utilization of a host matrix having at least one transition element which can, in accordance with the present invention, be structurally modified with at least one other element to create a greatly increased density of catalytically active sites for the hydrogen evolution reaction in an electrolytic cell. With a greater density of catalytically active sites the reaction between the catalytically active sites and hydrogen ions ($M+H^+ \rightarrow MH$) occurs much more readily. Furthermore, due to the high density of catalytically active sites, the probability of the bonded hydrogen atoms reacting with each other to form hydrogen gas ($2MH \rightarrow H_2+M+M$) is significantly increased. The increased catalytic activity of the materials of the present invention can yield a material having a charge transfer overvoltage which is 160–260 mV lower than that exhibited by mild steel cathodes under similar operating conditions.

The increased numbers of catalytically active sites not only reduces overvoltages but enables the materials to be more resistant to poisoning. This is because with materials of the present invention a certain number of catalytically active sites can be sacrificed to the effects of poisonous species while a large number of unpoisoned sites still remain to provide the desired catalysis for hydrogen evolution.

Such disordered materials of the present invention, unlike the specific and rigid structure of crystalline materials, are ideally suited for manipulation since they are not constrained by the symmetry of a crystalline lattice or by stoichiometry. By moving away from materials having restrictive crystalline symmetry, it is possible to accomplish a significant alteration of the local structural chemical environments involved in hydrogen evolution to enhance the catalytic properties of the materials. The disordered materials of the present invention can be modified in a substantially continuous range of varying percentages of modifier elements. This ability allows the host matrix to be manipulated by the modifier elements to tailor-make or engineer materials with characteristics suitable for hydrogen evolution. This is in contrast to crystalline materials which generally have a very limited range of stoichiometry available and thus a continuous range of control of chemical and structural modification of such crystalline materials is not possible.

In the disordered materials of the present invention, it is possible to attain unusual electronic configurations resulting from nearest neighbor interactions between lone pairs, microvoids, dangling bonds, and unfilled or vacant orbitals. These unusual electronic configurations can interact with the modifier elements of the present invention which are incorporated into the host matrix to readily modify the local structural chemical order and thus the electronic configurations of the matrix to provide numerous catalytically active sites for hydrogen evolution.

The disorder of the modified material can be of an atomic nature in the form of compositional or configurational disorder provided throughout the bulk of the material or in numerous regions of the materials. The disorder can also be introduced into the material by creating microscopic phases within the material which mimic the compositional or configurational disorder at the atomic level by virtue of the relationship of one phase to another. For example, the disordered materials can be created by introducing microscopic regions of a different kind or kinds of crystalline phases, or introducing regions of an amorphous phase or phases in addition to regions of a crystalline phase or phases. The interfaces between these various phases can provide surfaces which are rich in local chemical environments providing numerous catalytically active sites A major advantage of the disordered materials is that they can be tailor-made to provide a very high density of active catalytic sites relative to materials based upon a crystalline structure. The types of structures which provide the local structural chemical environments for improved catalytic efficiency in accordance with the present invention include multicomponent polycrystalline materials lacking long range compositional order, microcrystalline materials, amorphous materials having one or more phases, or multiphase materials containing both amorphous and crystalline phases or mixtures thereof.

The cathodes of the present invention can be formed by several methods. In the preferred method, a substrate is utilized onto which a layer of catalytic material is applied. The substrate can be in the conventional used forms such as sheet, expanded metal, wire, or screen configurations. The composition of the substrate can be nickel, steel, titanium, graphite, copper or other suitable materials. Preferably the substrate is sandblasted to provide better adhesion for the later applied catalytic layer. The layer of catalytic material of the invention can be applied to the substrate by vacuum deposition of the components (i.e., sputtering, vapor deposition, plasma deposition) or spraying. Such methods also offer ease and economy of preparation and enable the preparation of catalytic materials of any desired compositional range. The thickness of the layer preferably is on the order of $\frac{1}{2}$ to 2 microns or greater.

Cosputtering is a particularly suitable method for forming the materials of the present invention because it facilitates modification of the host matrix on an atomic scale, thus enabling tailor making of the material and also allowing for the formation of an intimate mixture of the material's component elements. Thus, the host matrix and modifier elements can be deposited in non-equilibrium metastable position or in other disordered arrangements, to produce the desired type and degree of disordered materials and create new local structural chemical environments providing the desired catalytically active sites.

The catalytic layer may also initially include leachable components like aluminum or zinc which are subsequently partially leached out to leave a layer of a higher surface to volume area which increases catalytic activity and further modified the catalytic material. Preferably, the actual surface area of the materials of the present invention will be on the order of 2 to 10 times greater than the geometric area.

A 100 to 1000 increase in surface area such as accomplished for Raney nickel cathodes, is not necessary for the catalytic materials of the present invention. A surface area in the range of 5 to 10 times greater than the geometric area provides materials which are mechanically very stable for hydrogen evolution and do not separate and degrade as do the highly porous Raney nickel cathodes. Furthermore, unlike a Raney nickel material, the materials which have a component partially removed in accordance with the present invention are not susceptible to rapid degradation when exposed to an air environment. In fact, one material prepared in accordance with the invention was stored in an air atmosphere for several months before life testing. Nevertheless, this material provided significant overvoltage savings for thousands of hours during subsequent life testing.

The removal of a component of the materials of the present invention may be accomplished by leaching as in the Raney process. However, the selective removal of the component provides unique advantages not provided by prior art Raney materials. The partial removal of the component from the disordered material provides the remaining matrix with a further modified local chemical order configuration with increased catalytic activity. Another advantage of leaching, in accordance with the present invention, is that after the removal of the component, a different modifier element can be added to the material to react with the exposed structural chemical environments to create additional numbers of catalytically active sites.

MATERIAL PREPARATION

A number of materials were prepared and tested to illustrate the advantages of the disordered catalytic materials of the present invention. The materials referred to hereinafter were prepared and tested in general accordance with the following procedures.

Nickel sheet or screen materials were used as the cathode substrates. The substrates were sandblasted to remove surface oxides and to roughen the surfaces to provide better adhesion for the later applied catalytic layer. The substrate was placed in a vacuum chamber of a Mathis R.F. sputtering unit chamber, or in some instances a Sloan Magnetron 1800 Sputtering unit. The chamber was evacuted to a background pressure of $1 \times 10^6$ torr. Argon gas was introduced into the chamber at partial pressures of approximately $6.0 \times 10^{-3}$ torr. The Mathis sputtering target included a surface of sections of the elements desired to be included in the catalytic layer. The relative percentages of the elements contained in the deposited disordered materials were dependent upon the relative sizes of the sections of the target dedicated to the component elements and the positioning of the substrate relative to the target.

With the Sloan 1800 Magnetron sputtering unit, however, each element which was to be a component of the final catalytic layer had a separate target dedicated only to that element and the relative percentages of the component elements deposited in the catalytic layer were controlled by adjustment of the magnetic flux associated with each target as is well known by those skilled in this art. Regardless of whether the materials were produced utilizing the Mathis or Sloan Units, the substrate was maintained at a relatively low temperature, for example 50° C. to 150° C., to aid in the formation of the desired disordered structure. The thickness of the catalytic layers deposited on the substrate were on the order of $\frac{1}{2}$ to 2 microns or thicker.

Some of the materials prepared had a component initially included therein and partially removed by leaching after formation of the cosputtered layers. The leaching of these materials was typically accomplished in a NaOH solution which was 17% by weight and at a temperature of 80° C. to 100° C. The duration of leaching was typically 1 to 4 hours.

Testing for shelf life stability of some of the materials was performed by heating them to a temperature of approximately 350° C. in an ambient environment for one-half hour. The materials did not show any degradation. The chemical composition of the catalytic layer was determined by energy dispersive spectroscopy or Auger spectroscopy. All chemical compositions stated in the following examples are given in atomic percentages.

The samples were tested in a half-cell utilizing 17% by weight NaOH as the electrolyte at a temperature of approximately 80° C. to 90° C. The hydrogen evolution potential required to produce a current density of 1 KA per square meter of cathode surface area was measured with respect to a Hg/HgO reference electrode. The current densities were calculated using the geometric surface area of one side of the electrode. The overvoltages were then calculated by subtracting the thermodynamic potential of the reaction, which is approximately 910 mV under these operating conditions. Some materials also were tested utilizing a 28% by weight solution of KOH as the electrolyte and the results did not vary significantly from the NaOH results.

Table 1 provides a summary of some of the low overvoltages which were exhibited by the materials prepared in accordance with the present invention. For comparison, a mild steel cathode was prepared from a sheet of mild steel which was sandblasted and tested in the same test cell under the same operating conditions as the materials of the present invention. The mild steel cathode exhibited a 270–380 mV overvoltage at a current density of 1 KA/m² at 80° C. In industry, electrolytic cells having mild steel cathodes are not operated substantially above 1 KA/m².

TABLE 1

Overvoltages for Various Materials of the Invention at a 80° C. Electrolyte Temperature and Current Density of 1 KA/m² and 5 KA/m²

| Composition (Atomic Percent) | Overvoltages at 1 KA/m² | Overvoltages at 5 KA/m² |
|---|---|---|
| $Ni_{40}Ti_{48}C_7O_5$ | 90 mV | 160 mV |
| $Ni_{47}Ti_{13}Al_{40}$ | 88 mV | 130 mV |
| $Ni_{74}Ti_{15}Sr_{11}$ | 105 mV | 155 mV |
| $Ni_{42}Ti_{41}Mo_{17}$ | 100 mV | 180 mV |
| $Ni_{45}Ti_{22}Mo_{11}Al_{22}$ | 105 mV | 175 mV |

Table 1 includes some representative overvoltages of cathodes formed from a nickel host matrix modified with titanium and at least one other element. The other modifier elements were selected from the group consisting of Mo, Al, Sr, C and O. Aluminum was cosputtered with Ni and Ti and then partially leached out in some of the materials. The compositions are the compositions as deposited.

One series of cathodes was produced by cosputtering from a Ni and Ti target to form a number of materials with various percentages of Ni and Ti. At least some of the materials of this series also included relatively small amounts of carbon and oxygen. All of the NiTi materials tested which had a Ni to Ti ratio of approximately 10 to 90, respectively, to approximately 90 to 10, respectively, exhibited overvoltages that are substantially lower than those exhibited by the commercially utilized mild steel and nickel cathodes. As discussed previously, mild steel cathodes exhibit 270 to 380 mV overvoltage in a commercial electrolyte cell and the overvoltages for nickel catalysts are much higher.

In another series one of which is illustrated in Table 1, the materials included Ni modified with Ti and Mo. For these materials the ratio of Ni to Ti atoms was approximately equal and the remainder of the material was Mo. Table 1 also shows a low overvoltage cathode based upon NiTiMo, where some of the Ti was replaced with a leachant like Al.

NiTiSr cathode materials also yield significantly lower overvoltages than mild steel cathodes. In a series of these materials, one of which is illustrated in Table 1, the Sr content was varied between 10 and 20%.

The low overvoltages of the materials of the invention at the higher current densities, such as at 5 KA/m², is very significant. The high current density operation is desirable to produce the desired product at a higher rate of production. The water electrolysis and chlor-alkali industries generally operate at between 1 and 2 KA/m², because of the increased energy loss at the higher current densities. Thus, the savings in power of the materials of the invention became even more substantial at higher current densities as illustrated by the 5 KA/m² results.

TABLE 2

Overvoltages for Various Materials of the Invention at a 80° C. Electrolyte Temperature and Current Density of 1 KA/m² and 5 KA/m²

| Composition (Atomic Percent) | Overvoltages at 1 KA/m² | Overvoltages at 5 KA/m² |
|---|---|---|
| $Ni_{31}Mo_7Si_{13}Al_{28}C_{13}O_{18}$ | 50 mV | 90 mV |
| $Ni_{45}Mo_{14}Si_{10}Al_{31}$ | 85 mV | 135 mV |
| $Ni_{77}Mo_{14}Si_9$ | 110 mV | 180 mV |
| $Ni_{77}Co_9Sr_{14}$ | 145 mV | 205 mV |

Table 2 shows some representative overvoltage results of cathodes formed from Ni modified with Mo or Co and at least one other element. All of these materials exhibited overvoltages which were significantly less than that exhibited by the mild steel electrode.

Many materials were prepared utilizing Ni as the host matrix modified by cosputtering with Mo and at least one other modifier element selected from the group consisting of Si, Al, Ta, Zn, and V. Some Ni—Mo including materials were also modified with oxygen by heat treating the NiMo materials in an ambient environment.

NiMoSiAl materials were formed by cosputtering the component elements and thereafter leaching out a portion of the Al. These materials provided the lowest overvoltages of all the materials prepared. This material also shows the unique advantages of modification with aluminum which can be accomplished with the materials of this present invention. The materials had overvoltages which were significantly lower than NiMoSi without Al. The reduced overvoltages are attributed to the remaining aluminum atoms acting as modifiers rather than merely the result of a surface enlargement effect, shown by the Raney nickel process.

TABLE 3

Overvoltages for Various Materials of the Invention at a 80° C. Electrolyte Temperature and Current Density of 1 KA/m² and 5 KA/m²

| Composition (Atomic Percent) | Overvoltages at 1 KA/m² | Overvoltages at 5 KA/m² |
|---|---|---|
| $Ni_{71.5}La_{28.5}$ | 105 mV | 160 mV |
| $Co_{90}La_{10}$ | 110 mV | 155 mV |
| $Co_{90}MM_{10}$ | 110 mV | 165 mV |

Table 3 illustrates some representative overvoltage results of cathodes formed from Co or Ni modified with a rare earth modifier which also provided very good catalytic materials for hydrogen evolution. A series of NiLa materials was prepared with the modification with La ranging from approximately 1.1% to 28.5%, only one of which is shown in Table 3. With the 1.1% La material the overvoltage was found to be approximately 210 mV. The other materials prepared showed a continued improvement in overvoltage corresponding to an increased percentage of La. For example, a $Ni_{75}La_{25}$ material had an overvoltage of 130 mV and a $Ni_{71.5}La_{28.5}$ material had an overvoltage of approximately 105 mV.

Cobalt can also be used as a host matrix and can be modified with La or Mish-metal (MM). Mish-metal is a much cheaper material than pure La and contains a substantial amount of Ce. The best of these materials also exhibited a 110 mV overvoltage. All of the above overvoltages are also substantially below those of mild steel.

While the above discussion of materials has shown certain combinations of host matrix elements and modifier elements the invention is not so limited. For example, it can be advantageous to modify a Ni or Mo or other transition element host matrix with any of the modifiers disclosed. In addition, other modifier elements may tend to lower overvoltages. These elements include Cr, Nb, Cu, Ru, Fe, and W. Also, small amounts of noble metals, such as Pt, Pd, Ag or Au can be added as modifiers.

One cathode having a layer of catalytic material of a cosputtered composition of 61% Ni and 39% Ti on a mild steel substrate was life tested for 2800 hours or approximately four months. The cathode provided a voltage savings of approximately 290 mV when compared to the mild steel cathode. Other life tests of similar durations also were conducted. One such life test utilized a cathode having a mild steel substrate and a catalytic material with a composition of $Ni_{49}Ti_{39}Al_{12}$ applied thereon. This sample provided a voltage savings of approximately 210 mV when compared to the mild steel cathode. A cathode having a catalytic material of $Ni_{41}Ti_{42}Mo_{17}$ on a mild steel substrate also provided a voltage savings of 210 mV.

The invention need not be limited to layers of catalytic material applied to a substrate. The entire bulk of the cathode can be formed of the catalytic materials of the invention without utilizing a substrate.

From the foregoing it can be seen that the disordered catalytic materials of the present invention can be utilized for a cathode in an electrolytic cell to reduce overvoltages over those of the most commonly used cathode materials, mild steel and nickel. Furthermore, the materials of the present invention, are very resistant to poisoning as exhibited by their stable performance during life testing. Moreover, the materials of the present invention can be made from relatively low cost components and can be produced by relatively simple methods to provide low cost energy saving cathodes.

While the present invention has been described in conjunction with specific embodiments, those of normal skill in the art will appreciate that modifications and variations can be made without departing from the scope of the present invention. such modifications and variations are envisioned to be within the scope of the appended claims.

What is claimed and desired to be secured by Letters Patent of the United States is:

1. A multicomponent compositionally disordered catalytic material comprising:
    a host matrix having at least one transition element; and
    said host matrix having incorporated therein one or more modifier elements, at least one said modifier element selected from a group consisting of Ti, Mo, Si, La, Ta, Ce, Zn, O, Cr, Nb, Cu, Fe, V, and Mish-metal, said modifier element modifying the local structural chemical environments of said material to provide the disorder throughout the bulk of the material and create an increased density of catalytically active sites for acting as a catalyst for a hydrogen evolution in an electrolytic cell, said material having at least one amorphous phase, microcrystalline phase, polycrystalline phase lacking long-range order, or any combination of these phases.

2. The catalytic material as defined in claim 1 wherein said at least one host matrix element is selected from the group consisting of Ni, Mo and Co.

3. The catalytic material as defined in claim 1 wherein said host matrix includes a second modifier element selected from the group consisting of Sr, Co, Al, C and Ru.

4. The catalytic material as defined in claim 1 wherein said host matrix includes Ni and said at least one modifier element includes Ti, the ratio of Ni atoms to Ti atoms being in the range of approximately 10:90, respectively, to approximately 90:10, respectively.

5. The catalytic material as defined in claim 1 wherein said host matrix includes Ni and Ti and said modifier element includes Mo.

6. The catalytic material as defined in claim 1 wherein said host matrix includes nickel and said modifier element includes approximately 28.5 atomic percent La or less.

7. The catalytic material as defined in claim 6 wherein said material includes at least 25 atomic percent La.

8. The catalytic material as defined in claim 1 wherein said host matrix includes Co and said modifier elements are derived from Mish-metal.

9. The catalytic material as defined in claim 1 wherein said catalytic material forms at least part of a cathode for an electrolytic cell.

10. The catalytic material as defined in claim 1, wherein said catalytic material is formed by vacuum deposition techniques.

11. The catalytic material as defined in claim 1 wherein said material is in the form of a layer formed by cosputtering said host material element and said modifier element.

12. A cathode for an electrolytic cell said cathode comprising:
    a substrate, and a layer of a compositionally disordered multicomponent catalytic material applied to said substrate, said material including a host matrix having at least one transition element, and said host matrix having incorporated therein one or more modifier elements, at least one modifier element selected from a group consisting of Ti, Mo, Si, La, Ta, Ce, Zn, O, Cr, Nb, Cu, Fe, V, and Mish-metal, said modifier element modifying the local structural chemical environments of said material to provide disorder throughout the bulk of said material and create an increased density of catalytically active sites for acting as a catalyst for hydrogen evolution in an electrolytic cell, said material having at least one amorphous phase, microcrystalline phase, polycrystalline phase lacking long-range order, or any combination of these phases.

13. The cathode as defined in claim 12 wherein said at least one host matrix element is selected from the group consisting of Ni, Mo and Co.

14. The cathode as defined in claim 12 wherein said host matrix includes a second modifier element selected from the group consisting of Sr, Co, Al, C and Ru.

15. The cathode as defined in claim 12 wherein said host matrix includes Ni and Ti and said modifier element includes Mo.

16. The cathode as defined in claim 12 wherein said host matrix includes Co and said modifier elements are derived from Mish-metal.

17. The cathode as defined in claim 12 wherein said catalytic material is formed by vacuum deposition techniques.

18. The cathode as defined in claim 12 wherein said material is in the form of a layer formed by cosputtering said host material element and said modifier element and said substrate.

19. A method of forming a cathode for use in an electrolyte cell comprising:
forming a host matrix from at least one transition metal element and, substantially simultaneously modifying the local structural chemical environments of said material by vacuum depositing one or more modifier elements, at least one of said modifier elements selected from a group consisting of Ti, Mo, Si, La, Ta, Ce, Zn, O, Cr, Nb, Cu, Fe, V, and Mish-metal, to provide a catalytic active material disordered throughout the bulk of the material and create an increased density of catalytically active sites for acting as a catalyst for hydrogen evolution in an electrolytic cell, said material having at least one amorphous phase, microcrystalline phase, polycrystalline phase lacking long-range order, or any combination of these phases.

20. The method as defined in claim 19 wherein said at least one host matrix element is selected from the group consisting of Ni, Mo and Co.

21. The method as defined in claim 19 wherein said host matrix includes a second modifier element selected from the group consisting of Sr, Co, Al, C and Ru.

22. The method as defined in claim 19 wherein said host matrix includes Ni and Ti and said modifier element includes Mo.

23. The method as defined in claim 19 wherein said host matrix includes Co and said modifier elements are derived from Mish-metal.

24. The method as defined in claim 19 further including:
forming said material by cosputtering said host material element and said modifier element.

25. The method as defined in claim 19 further including:
applying said material to a substrate.

* * * * *

UNITED STATES PATENT AND TRADEMARK OFFICE
CERTIFICATE OF CORRECTION

PATENT NO. : 4,545,883

DATED : October 8, 1985

INVENTOR(S) : Stanford R. Ovshinsky, Bloomfield Hills; Krishna Sapru, Troy; Edmund L. Yee, Warren, all of Michigan It is certified that error appears in the above-identified patent and that said Letters Patent is hereby corrected as shown below:

Column 1, line 30, delete "$2OH^{31}$" and insert --$2OH^-$--;
Column 1, line 60, delete "chloralkali" and insert --chlor-alkali--;
Column 6, line 60, after "material" delete "be" and insert --by--;
Column 7, line 3, after "sites" insert--.--;
Column 11, line 56, delete "such" and insert --Such--.

Signed and Sealed this

Twenty-fourth Day of June 1986

[SEAL]

Attest:

DONALD J. QUIGG

Attesting Officer

Commissioner of Patents and Trademarks